US 6,662,909 B2

(12) United States Patent
Taniguchi

(10) Patent No.: US 6,662,909 B2
(45) Date of Patent: Dec. 16, 2003

(54) ELECTRICALLY OPERATED PARKING BRAKE APPARATUS

(75) Inventor: Makoto Taniguchi, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 13 days.

(21) Appl. No.: 10/071,180

(22) Filed: Feb. 11, 2002

(65) Prior Publication Data

US 2002/0108816 A1 Aug. 15, 2002

(30) Foreign Application Priority Data

Feb. 15, 2001 (JP) .................................... P.2001-038830

(51) Int. Cl.[7] ................................................. B60L 7/00
(52) U.S. Cl. ...................... 188/162; 188/156; 188/171; 188/72.8; 303/20
(58) Field of Search ................................ 188/162, 156, 188/171, 2 D, 72.8, 265; 303/20

(56) References Cited

U.S. PATENT DOCUMENTS

| 3,937,295 A | * | 2/1976 | Wright .................... 180/271 |
| 4,448,436 A | * | 5/1984 | Ohzono .................... 280/282 |
| 4,629,043 A | * | 12/1986 | Matsuo et al. ............ 477/184 |
| 5,251,968 A | * | 10/1993 | Rath ......................... 303/9.62 |
| 6,244,394 B1 | * | 6/2001 | Gutierrez et al. ......... 188/72.8 |
| 6,419,328 B1 | * | 7/2002 | Kinoshita ................... 303/6.1 |
| 6,513,632 B2 | * | 2/2003 | Peter ......................... 188/162 |
| 6,533,082 B2 | * | 3/2003 | Gill et al. .................. 188/156 |
| 2002/0100647 A1 | * | 8/2002 | Miyakawa et al. ........ 188/162 |
| 2002/0129999 A1 | * | 9/2002 | Peter ......................... 188/162 |

FOREIGN PATENT DOCUMENTS

| DE | 4129919 | * | 3/1993 |
| DE | 4129934 | * | 3/1993 |
| GB | 2304838 | * | 3/1997 |
| JP | 59212929 | * | 12/1984 |
| JP | 2000309255 | * | 11/2000 |

* cited by examiner

Primary Examiner—Christopher P. Schwartz
Assistant Examiner—Devon Kramer
(74) Attorney, Agent, or Firm—Sughrue Mion, PLLC

(57) ABSTRACT

An electrically operated parking brake apparatus that includes a ball screw mechanism driven by an electric motor so as to move a nut member along a screw-threaded shaft. Two Bowden cables, for example, are connected to left and right ends of an equalizer supported on the nut member via an upper support shaft and a lower support shaft for transmitting brake operation force to wheel brakes. Since an axis of the upper and lower support shafts provided at positions facing each other across the screw-threaded shaft for swingably supporting the equalizer on the nut member passes through the center of the screw-threaded shaft, and a line connecting portion where the pair of Bowden cables are connected to the equalizer passes through the center of the screw-threaded shaft, the application of an unbalanced load to the screw-threaded shaft is prevented.

6 Claims, 10 Drawing Sheets

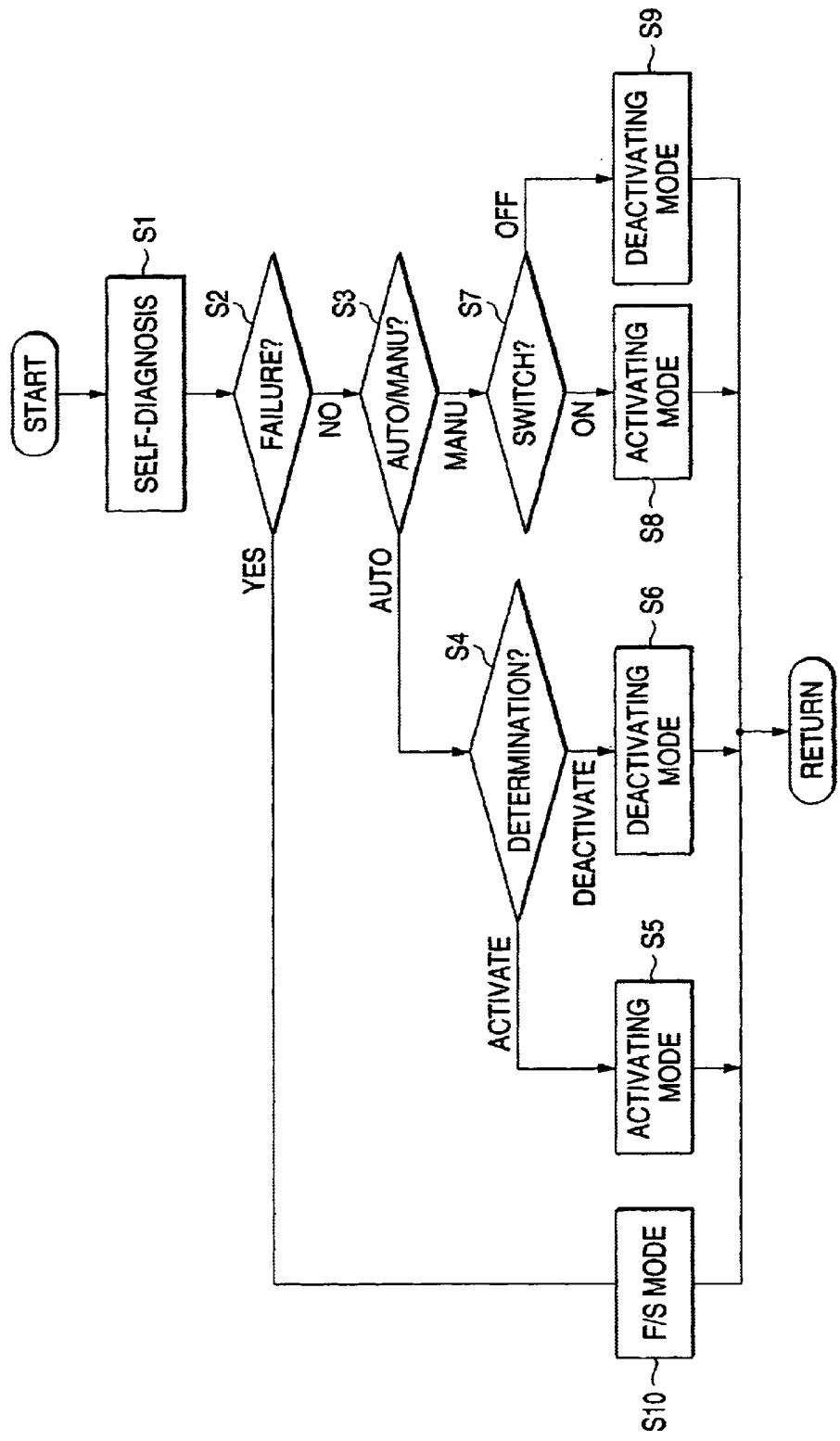

ELECTRICALLY OPERATED PARKING BRAKE APPARATUS

BACKGROUND OF THE INVENTION

1. Field of the Invention

The present invention relates to a parking brake apparatus for applying a brake force to wheels of a parked vehicle. More particularly, the present invention is related to an electrically operated parking brake apparatus for applying the brake force to the wheels through the driving force of an electric motor without relying upon the force applied by the hand or foot of a driver.

2. Description of the Related Art

JP-A-2000-309255 discloses an electrically operated parking brake apparatus with a screw mechanism having in turn a screw-threaded shaft adapted to be rotationally driven by an electric motor, and a nut member adapted to mesh with the screw-threaded shaft. When the screw-threaded shaft is rotated, the nut member is moved along the screw-threaded shaft, whereby a brake operating force is transmitted to wheel brakes via cables connected to the nut member.

When two wheel brakes are put in operation by driving two cables with a single electrically operated parking brake apparatus, it is known to use an equalizer rotatably supported at a central portion thereof by a support shaft and having cables connected to ends thereof. In the electrically operated parking brake apparatus disclosed in JP-A-2000-309255, the equalizer is provided at a position which is situated away from the screw mechanism, and the movement of the nut member of the screw mechanism is transmitted to the equalizer via two slide rods and a cable so that the brake operating force is uniformly divided at the equalizer for transmission to the two wheel brakes via two cables. Then, the two slide rods situated facing each other across the screw-threaded shaft are connected to the nut member such that the reaction force of the brake operating force is not applied to the nut member and the screw-threaded shaft as an unbalanced load.

In the related art electrically operated parking apparatus described above, however, since the nut member and the equalizer are connected to each other via the two slide rods and the cable, the construction of the parking apparatus is complicated because the number of components is increased and also the size of the apparatus is enlarged.

SUMMARY OF THE INVENTION

The present invention was made in view of the aforementioned problems in the related art, and an object of the invention is to provide an electrically operated parking brake apparatus which includes a smaller number of components and hence is simple in construction and small in size, and which can prevent an unbalanced load from being applied from the equalizer to the screw mechanism.

With a view to attaining this object, according to the invention, an electrically operated parking brake apparatus, includes:

- a pair of transmission members for transmitting a brake operating force to wheel brakes;
- an electric motor;
- a screw mechanism including a screw-threaded shaft adapted to be rotationally driven by the electric motor, and a nut member meshing with the screw-threaded shaft, the nut member being movable along the screw-threaded shaft by the rotation of the screw-threaded shaft;
- an equalizer having connecting portions connecting the pair of transmission members; and
- a pair of support shafts disposed at positions facing each other across the screw-threaded shaft for swingably supporting the equalizer on said nut member, wherein an axis of the pair of support shafts substantially passes through a center of the screw-threaded shaft, and a line connecting the connecting portions of the equalizer substantially passes through the center of the screw-threaded shaft.

According to the above construction, since the axis of the pair of support shafts provided at the positions facing each other across the screw-threaded shaft for swingably supporting the equalizer on the nut member passes through the center of the screw-threaded shaft, the generation of an unbalanced load is prevented which attempts to bend the screw-threaded shaft in a direction normal to a plane containing the axis of the pair of support shafts. In addition, since the line connecting the portions where the pair of transmission members are connected to the equalizer passes through the center of the screw-threaded shaft, the generation of an unbalanced load is prevented which attempts to bend the screw-threaded shaft in a direction normal to a plane containing the line connecting the portions where the pair of transmission members are connected to the equalizer. Thus, the increase in the number of components and enlargement of the size of the parking brake apparatus can be avoided, and the smooth operation of the screw mechanism can be ensured by preventing the generation of an unbalanced load which is applied to the screw-threaded shaft.

Note that Bowden cables 13, 13, a ball screw mechanism 49, and an upper support shaft 51 and a lower support shaft 52 described in an embodiment of the invention correspond to the transmission members, the screw mechanism and the support shafts of the invention, respectively.

BRIEF DESCRIPTION OF THE DRAWINGS

FIG. 10 is a flow chart for explaining the operation of the electrically operated parking brake apparatus.

DETAILED DESCRIPTION OF THE PREFERRED EMBODIMENTS

A mode for carrying out the invention will be described below based on an embodiment of the invention illustrated in FIGS. 1 to 10.

Figure 1:
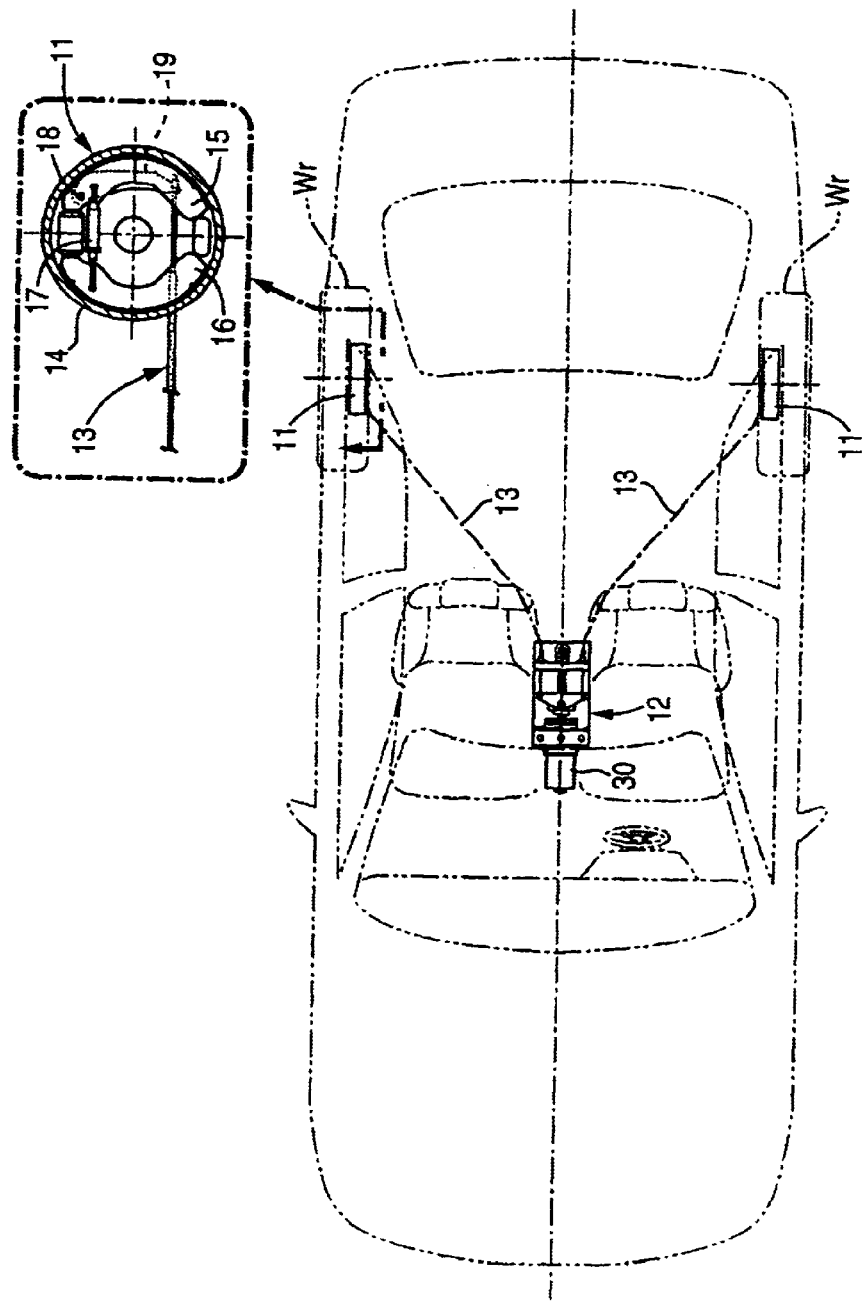
FIG. 1 is a plan view showing a vehicle provided with an electrically operated parking brake apparatus according to the invention.

As shown in FIG. 1, drum type wheel brakes 11, 11 are provided on left and right rear wheels Wr, Wr of a vehicle, and an electrically operated brake apparatus 12 disposed beside a driver's seat is connected to the wheel brakes 11, 11 via left and right Bowden cables 13, 13. Each wheel brake 11 includes a brake drum 14, a pair of brake shoes 15, 16, a connecting rod 17 and a lever 19. The brake shoes 15, 16 are adapted to be brought into contact with an inner circumferential surface of the brake drum 14. The connecting rod 17 is adapted to connect the pair of brake shoes 15, 16. The lever 19 is rotatably supported at one end thereof on the brake shoe 15 via a pin 18, and the Bowden cable 13 is connected to the other end thereof.

Consequently, when the Bowden cable 13 is pulled with an electric motor 30 provided on the electrically operated parking brake apparatus 12, the lever 19 rotates about the pin 18 in a clockwise direction of FIG. 1 so as to apply a compression load on the connecting rod 17. Then, the brake shoe 16 is pushed to the left as viewed in FIG. 1 by virtue of the load so as to be pressed against the brake drum 14, whereas the brake shoe 15 is pushed to the right as viewed in the same figure via the connecting rod 17 and the pin 18 to be pressed against the drum 14, whereby a brake force is generated on the wheel brakes 11. Conversely, when the Bowden cable 13 is loosened by the electric motor 30, the brake shoes 15, 16 are allowed to move away from the brake drum 14, whereby the brake force on the wheel brakes 11 is released.

In addition, since the electrically operated parking brake apparatus 12 is disposed besides the driver's seat, the driver can manually operate the apparatus for applying or releasing the brake force with ease, and in case the electric motor 30 or a control system therefor fails, the driver can manually apply or release the brake force to or from the wheel brakes 11 with ease. Furthermore, drastic bending of the Bowden cables 13, 13 extending from the electrically operated parking brake apparatus 12 to the wheel brakes 11, 11 can be prevented to thereby reduce the transmission loss of the brake operating force.

Figure 2:
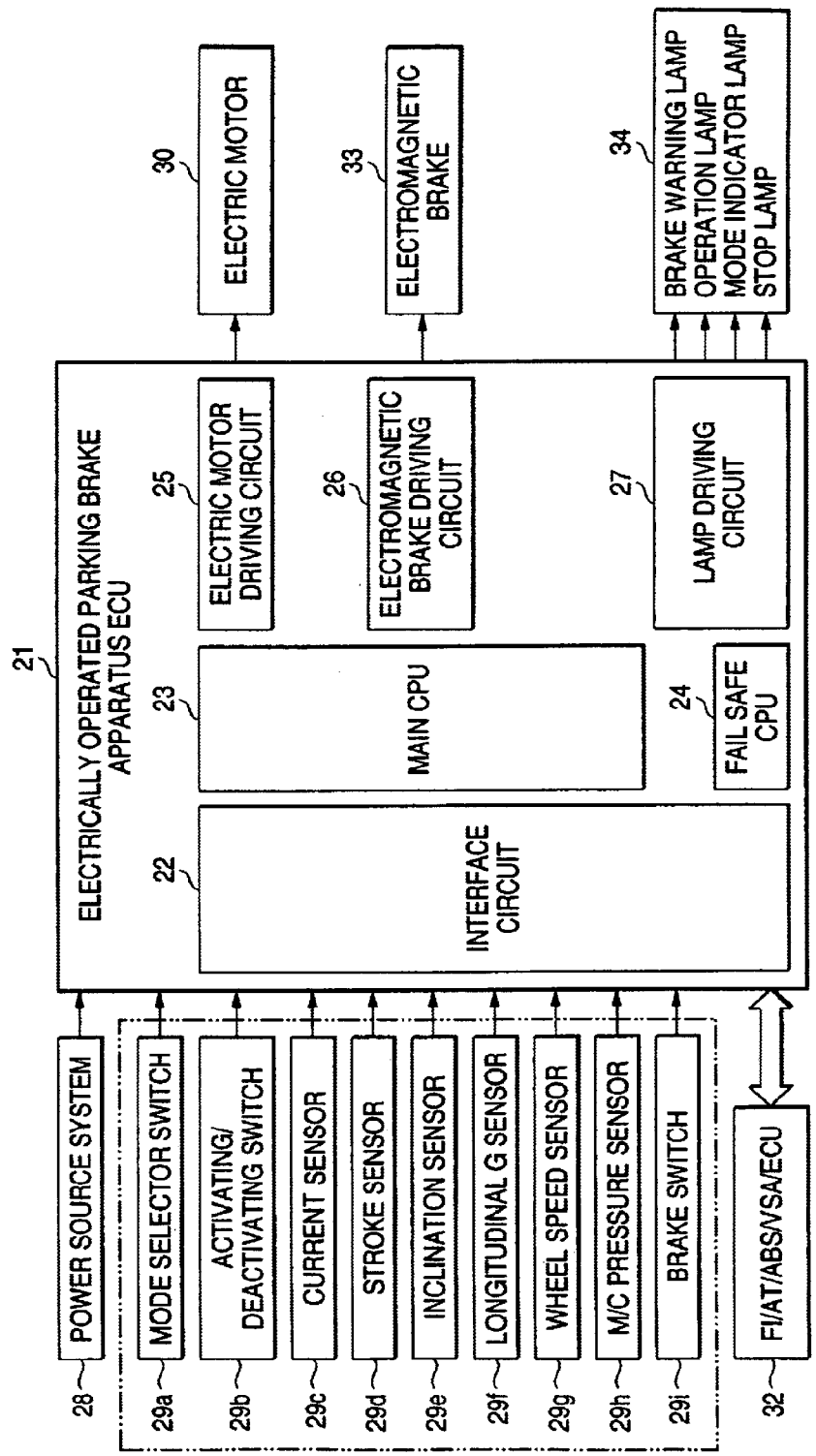
FIG. 2 is a block diagram of a control apparatus for the electrically operated parking brake apparatus.
Figure 3:
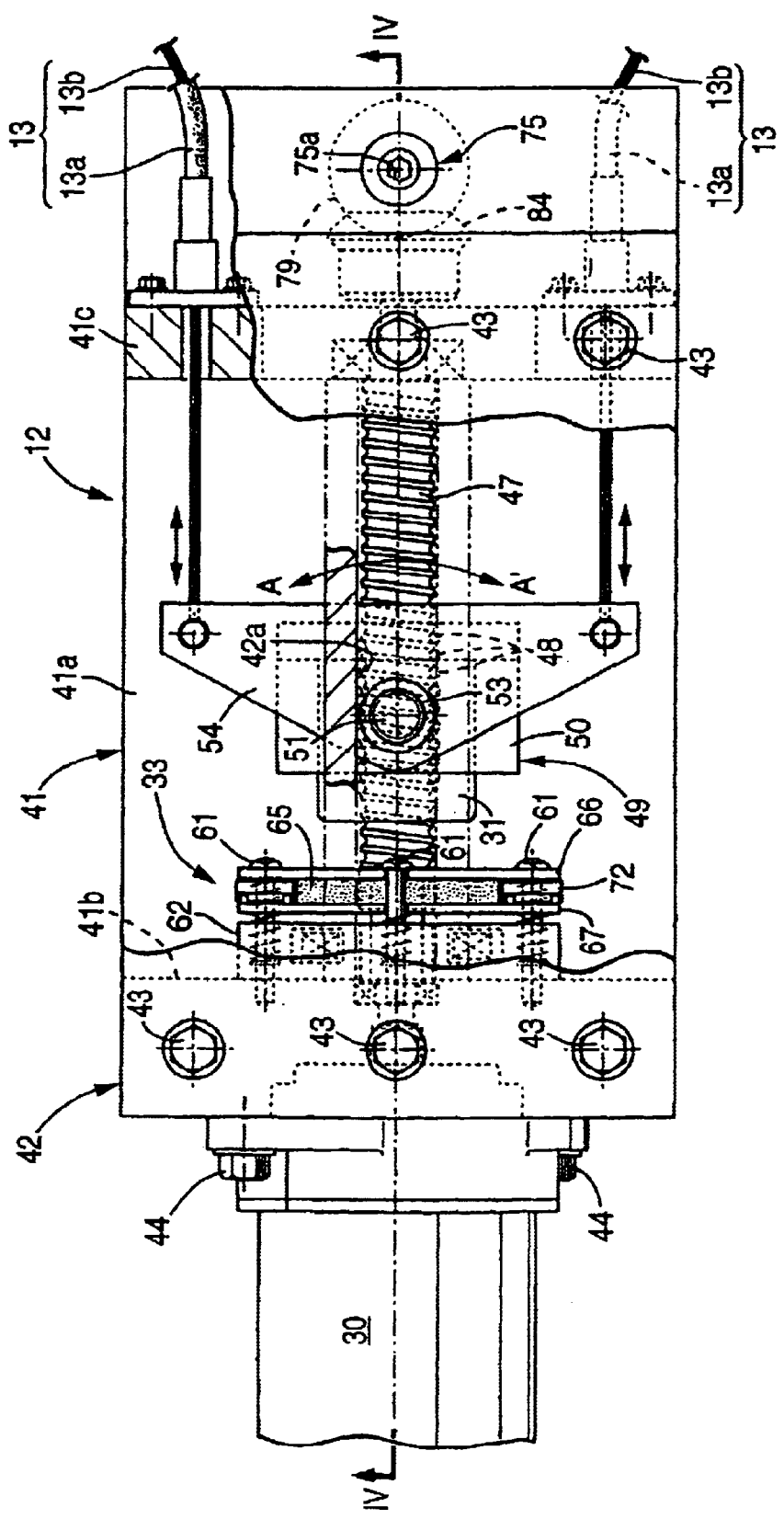
FIG. 3 is a plan view, partially cut away, of the electrically operated parking brake apparatus.

As shown in FIG. 2, an electrically operated parking brake apparatus ECU 21 for controlling the operation of the electrically operated parking brake apparatus 12 includes an interface circuit 22, a main CPU 23, a fail safe CPU 24, an electric motor driving circuit 25, an electromagnetic brake driving circuit 26, and a lamp driving circuit 27. The electrically operated parking brake apparatus ECU 21 is fed from a power source 28. In addition, connected to the interface circuit 22 are a mode selector switch 29a for selecting an automatic or manual mode, an activating/deactivating switch 29b for activating or deactivating the operation of the electrically operated parking brake apparatus 12 through a switch operation when the manual mode is selected, a current sensor 29c for detecting current flowing to the electric motor 30, a stroke sensor 29d for detecting the position of a nut member 31 which will be described later, an inclination sensor 29e for detecting the longitudinal inclination of a road surface on which the subject vehicle is parked, a longitudinal acceleration sensor 29f for detecting the longitudinal acceleration of the subject vehicle, a wheel speed sensor 29g for detecting the wheel speed when the subject vehicle moves forward or backward, a master cylinder pressure sensor 29h for detecting the master cylinder pressure of a hydraulic brake system, and a brake switch 29i for detecting the operation of a brake pedal.

In addition, various signals such as a throttle position signal, a shift position signal, an idle stop signal, and a brake control signal are inputted to the interface circuit 22 of the electrically operated parking brake apparatus ECU 21 from an external ECU 32 for a fuel injection apparatus, an automatic transmission, an anti-lock brake system and a vehicle stability assist apparatus. The electric motor driving circuit 25 is connected to the electric motor 30, the electromagnetic brake driving circuit 26 to an electromagnetic brake 33, which will be described later, and the lamp driving circuit 27 to lamps 34 such as a brake warning lamp, an in-operation lamp, a mode indicator lamp, and stop lamps.

Next, the construction of the electrically operated parking brake apparatus 12 will be described with reference to FIGS. 3 to 7.

A housing 41 constituting a main body portion of the electrically operated parking brake apparatus 12 defines a bottom wall 41a disposed horizontally, a front erecting wall 41b erecting from a front end of the bottom wall 41a and a rear erecting wall 41c erecting from the bottom wall 41a at a position in the vicinity of a rear end thereof. An upper cover 42 is fixed at front and rear ends thereof onto upper sides of the front erecting wall 41b and the rear erecting wall 41c with a plurality of bolts 43, respectively. The electric motor 30 having an output shaft 30a provided so as to extend rearward is fixed to a front face of the front erecting wall 41b of the housing 41 with a plurality of bolts 44.

A screw-threaded shaft 47 is supported on the front erecting wall 41b and the rear erecting wall 41c via ball bearings 45, 46, respectively, and the output shaft 30a of the electric motor 30 is connected to a front end of the screw-threaded shaft 47. The nut member 31 is brought into mesh engagement with an outer circumference of the screw-threaded shaft 47 via a number of balls 48, and a ball screw mechanism 49 is constituted by the screw-threaded shaft 47, the balls 48, and the nut member 31. A collar 50 is press-fitted on an outer circumference of the nut member 31, and vertically extending upper and lower support shafts 51, 52 are fixed to upper and lower surfaces of the collar 50, respectively. A guide roller 53 rotatably supported at an upper end of the upper support shaft 51 is movably fitted in a guide groove 42a formed on a lower surface of the upper cover 42 in a longitudinal direction.

An equalizer 54 having an oval cross section which is disposed to surround the outer circumference of the nut member 31 is supported by the upper support shaft 51 and the lower support shaft 52 in such a manner as to swing transversely. The Bowden cables 13, 13 are each constituted by an outer tube 13a, 13a and an inner cable 13b, 13b accommodated in the outer tube 13a, 13a in such a manner as to move relative to the outer tube 13a, 13a. Front ends of the outer tubes 13a, 13a are fixed to a back side of the rear erecting wall 41c, and front ends of the inner cables 13b, 13b extend through the rear erecting wall 41c to be fixed to left and right end portions of the equalizer 54.

Figure 5:
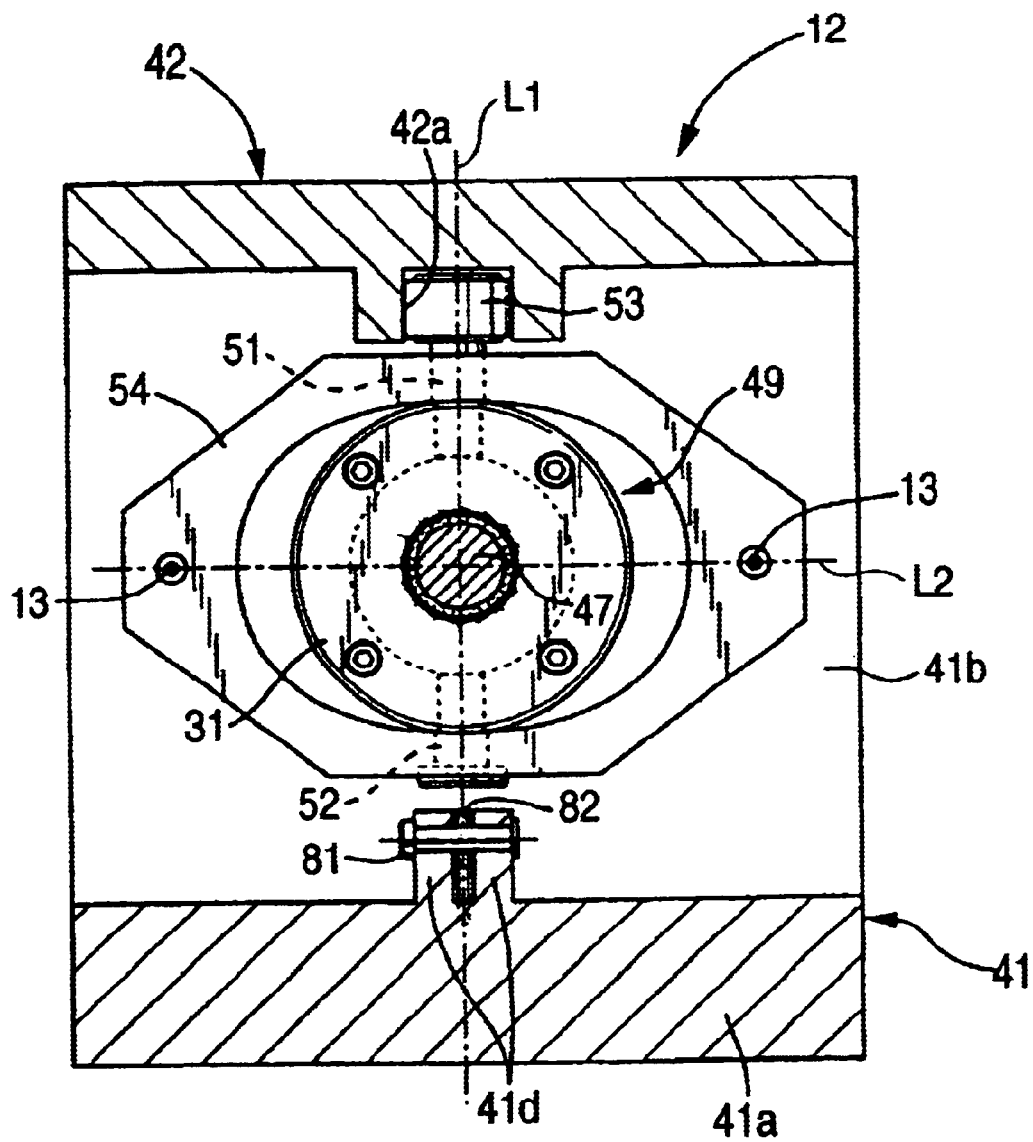
FIG. 5 is a sectional view taken along the line V—V in FIG. 4.

As shown in FIG. 5, an axis L1 of the upper support shaft 51 and the lower support shaft 52 extends in a perpendicular direction and passes through the center of the screw-threaded shaft 47, whereas a line L2 connecting portions where the pair of Bowden cables 13, 13 are connected to the equalizer 54 extends horizontally and passes through the center of the screw-threaded shaft 47. In case the axis L1 is offset transversely from the center of the screw-threaded shaft 47, the screw-threaded shaft 47 is subjected to an unbalanced load which bends the screw-threaded shaft 47 in a direction normal to a plane containing the axis L1 (i.e., a transverse direction) due to a load from the Bowden cable 13, 13. In addition, in case the line L2 is offset vertically from the center of the screw-threaded shaft 47, the screw-threaded shaft 47 is subjected to an unbalanced load which bends the screw-threaded shaft 47 in a direction normal to a plane containing the line L2 (i.e., a vertical direction) due to the load from the Bowden cables 13, 13.

According to the invention, however, since the axis L1 and the line L2 both pass through the center of the screw-threaded shaft 47, the application of the unbalanced load which attempts to bend the screw-threaded shaft 47 is prevented so that the ball screw mechanism 49 can be operated in a smooth fashion. Moreover, since the guide roller 53 is supported by making use of the upper support shaft 51, the number of components of the parking brake apparatus is decreased.

The electromagnetic brake 33 includes a core 62, a coil 63, a rotor 65, a plate 66 and an armature 67. The core 62 is fixed to a back side of the front erecting wall 41b with four bolts 61. The coil 63 is accommodated in the interior of the core 62. The rotor 65 is fixed to the front of the screw-threaded shaft 47 with a key 64 so as to be situated on a back side of the core 62. The plate 66 is longitudinally movably supported with four bolts 61 and disposed between a back side of the rotor 65 and head portions 61a of the bolts 61. The armature 67 is longitudinally movably supported with four bolts 61, and disposed between the back side of the core 62 and a front side of the rotor 65. A first coil spring 68 and a second coil spring 69 are supported around an outer circumference of each of the two vertically disposed bolts 61, 61. The first coil springs 68, disposed between recessed portions 62a in the core 62 and the armature 67, bias the armature 67 in a direction in which the armature 67 is brought into contact with the front side of the rotor 65, and the second coil springs 69, disposed between the armature 67 and the plate 66, bias the armature 67 and the plate 66 in directions in which the armature 67 and the plate 66 move away from the front and back sides of the rotor 65. In addition, only the first coil spring 68 is supported on an outer circumference of each of the two horizontally disposed bolts 61, 61, and the second coil spring 69 is not supported thereon in order to avoid the interference with an elongated hole 71a in an arm portion 71 of a release member 70 which will be described later.

The biasing force of the first coil springs 68 is set to be stronger than that of the second coil springs 69 and consequently, when the coil 63 is de-magnetized, the rotor 65 is held between the armature 67 and the plate 66 to thereby restrict the rotation of the screw-threaded shaft 47. In contrast, when the coil 63 is magnetized, the armature 67 is drawn by the core 62 against the biasing force of the first coil springs 68, and the armature 67 and the plate 66 are caused to move away from the rotor 65 by the biasing force of the second coil springs 69 so that the rotation of the screw-threaded shaft 47 is allowed.

Figure 6:
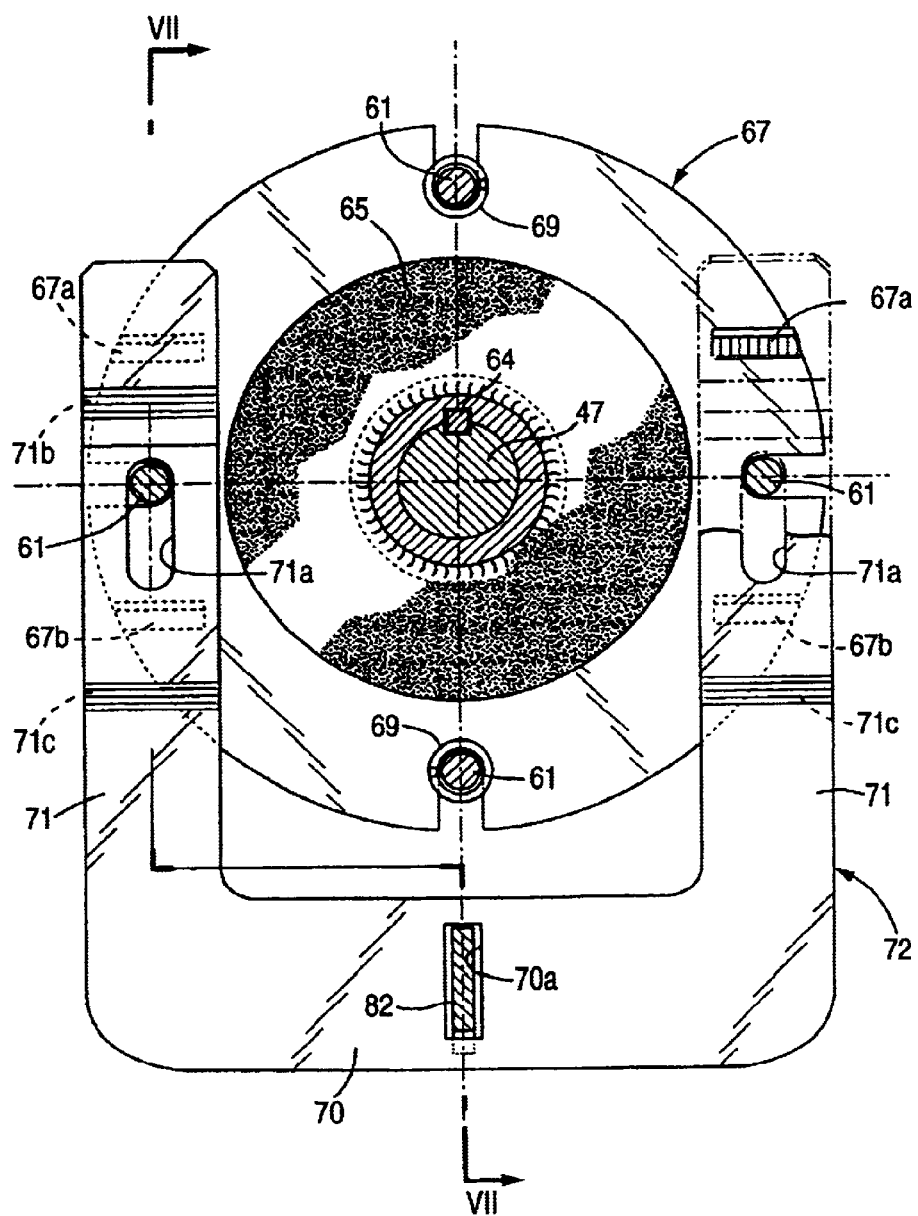
FIG. 6 is a sectional view taken along the line VI—VI in FIG. 4.
Figure 7:
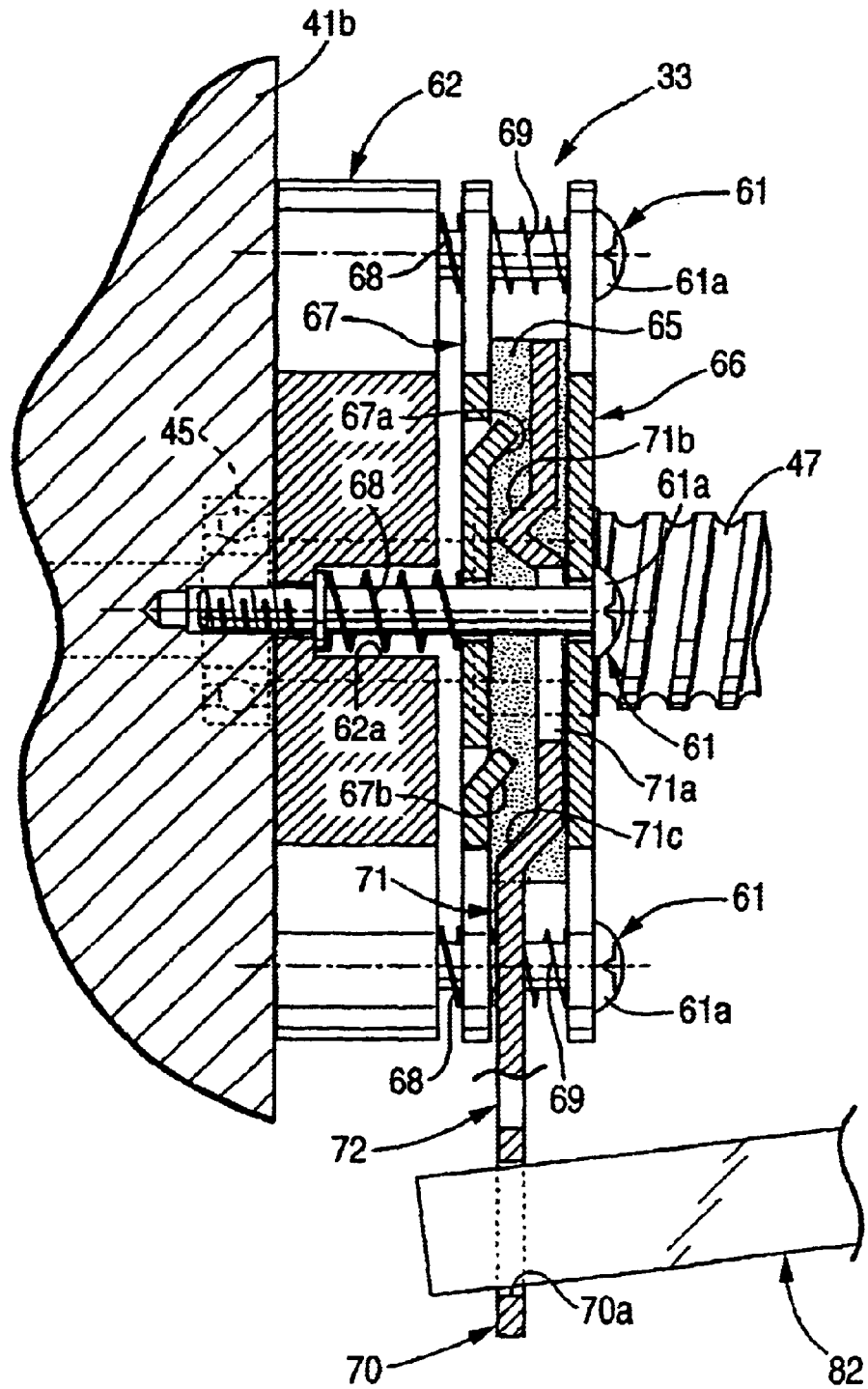
FIG. 7 is a sectional view taken along the line VII—VII in FIG. 6.

A release member 72 is disposed between the plate 66 and the armature 67, and includes a transversely extending base portion 70 and arm portions 71, 71 extending upwardly from ends of the base portion 70 so as to be formed in a U-shape. The two horizontally disposed bolts 61, 61 pass through elongated holes 71a, 71a formed in the left and right arm portions 71, 71 in such a manner as to extend in vertical directions, whereby the release member 72 is allowed to be freely guided in vertical directions. Two upper and lower inclined surfaces 71b, 71c are formed on a side of each arm portion 71 of the release member 72 which faces the armature 67, and two upper and lower inclined surfaces 67a, 67b are formed on the armature 67 in such a manner as to be brought into contact with the inclined surfaces 71b, 71c. When the release member 72 is situated at a lowered position as illustrated in FIGS. 6 and 7, the inclined surfaces 71b, 71c; 71b, 71c of the release member 72 are kept away from the inclined surfaces 67a, 67b; 67a, 67b of the armature 67.

A rotational shaft 75 is supported on a plane bearing 73 provided at a rear end of the bottom wall 41a of the housing 41 and a plane bearing 74 provided at a rear end of the rear erecting wall 41c of the housing 41 in such a manner as to move vertically and rotate freely. A coil spring 78 is disposed between a spring seat 77 supported at a lower portion of the rotational shaft 75 via a ball bearing 76 and the bottom wall 41a of the housing 41. The rotational shaft 75 which is biased upwardly by virtue of the biasing force of the coil spring 78 is stopped at a position where a driving bevel gear 79 fixed to an upper portion of the rotational shaft 75 is brought into contact with a lower surface of the plane bearing 74. A hexagonal hole 75a is formed axially into an upper end of the rotational shaft 75 so that a hexagonal wrench 80 (refer to FIG. 8) is inserted thereinto.

A lever 82 is supported at an intermediate portion thereof on a bracket 41d provided at a central portion of the bottom wall 41a of the housing 41 in such a manner as to swing vertically via the pin 81 extending transversely. A transversely extending pin 83 is fixed to a bracket 77a provided on an upper surface of the spring seat 77, and this pin 83 fits in a longitudinally extending elongated hole 82a formed in the lever 82 at a rear end thereof. A front end of the lever 82 fits in the vertically extending elongated hole 70a formed in the base portion 70 of the release member 72.

A follower bevel gear 84 is fixed to a rear end of the screw-threaded shaft 47 which extends rearward through the rear erecting wall 41c. When the rotational shaft 75 is situated at a raised position by virtue of the biasing force of the coil spring 78, the driving bevel gear 79 on the rotational shaft 75 does not mesh with the follower bevel gear 84 on the screw-threaded shaft 47, but when the rotational shaft 75 is lowered against the biasing force of the coil spring 78, the driving bevel gear 79 and the follower bevel gear 84 can be brought into mesh engagement with each other.

Next, FIG. 10 is a flowchart depicting the operation of the electrically operated parking brake apparatus constructed as described above according to an embodiment of the invention.

First, in step S1, outputs from the respective sensors 29c to 29h are compared with their upper and lower limit values so as to check the conditions of the sensors 29c to 29h by confirming whether or not the outputs fall within their upper and lower limit values, respectively. Further, the conditions of the electric motor 30 are checked by determining whether or not the electric motor 30 operates properly by allowing a current to flow slightly to the electric motor 30. In the following step S2, in case it is determined that the respective sensors 29c to 29h and the electric motor 30 operate normally, and in step S3 in case it is determined that the automatic mode is selected with the mode selector switch 29a, the flow proceeds to step S4. In step S4, the main CPU 23 of the electrically operated parking brake apparatus ECU 21 determines whether or not the electrically operated parking brake apparatus needs to be activated based on the inclination of the road surface detected by the inclination sensor 29e, the longitudinal acceleration detected by the longitudinal acceleration sensor 29f, the wheel speeds detected by the wheel speed sensors 29g, the master cylinder pressure of the hydraulic brake apparatus detected by the master cylinder pressure sensor 29h, the operating conditions of the brake pedal detected by the brake switch 29i and the throttle position signal, shift position signal, idle stop signal and brake control signals inputted from the external ECU. Then, based on the result of the determination in step S4, in step S5 the main CPU 23 drives the electromagnetic brake 33 and the electric motor 30 to activate the electrically operated parking brake apparatus 12 or in step S6, the main CPU 23 drives the electromagnetic brake 33 and the electric motor 30 to deactivate the electrically operated parking brake apparatus 12.

In contrast, in case the manual mode is selected with the mode selector switch 29a in step S3, in step S7 the conditions of the activating/deactivating switch 29b are determined. Based on the results of the determination in step S7, in step S8 the electromagnetic brake 33 and the electric motor 30 are driven to activate the electrically operated parking brake apparatus 12, or in step S9 the electromagnetic brake 33 and the electric motor 30 are driven to deactivate the electrically operated parking brake apparatus 12. In addition, in case it is determined in step S2 that the respective sensors 29c to 29h and the electric motor 30 are operated abnormally, in step S10 a fail safe mode is selected so that the electrically operated parking brake apparatus 12 can be activated or deactivated manually by the driver without involvement of the electric motor 30.

Figure 4:
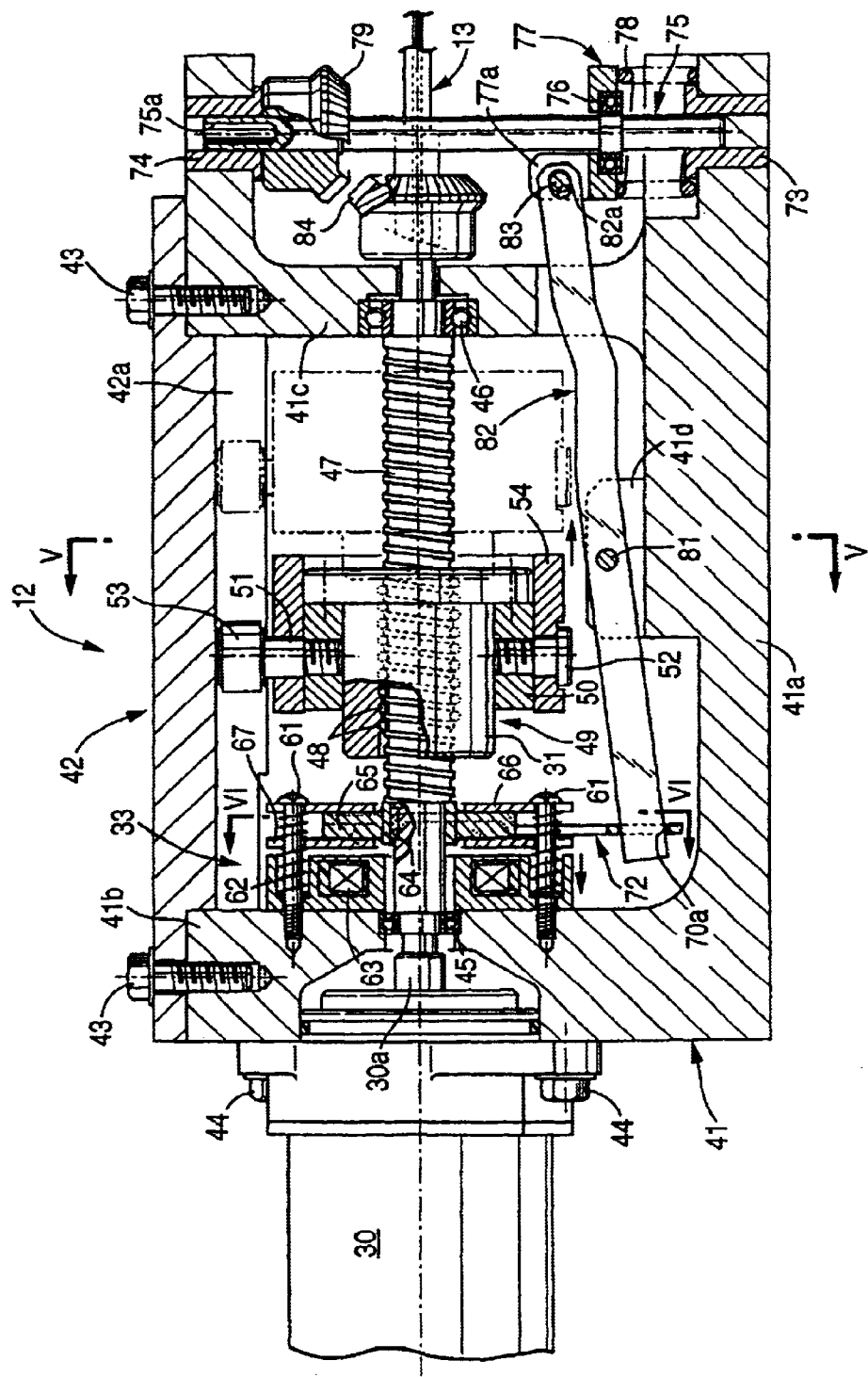
FIG. 4 is a sectional view taken along the line IV—IV in FIG. 3.

When the electrically operated parking brake apparatus 12 is not in operation, the nut member 31 of the ball screw mechanism 49 is situated at a rear position indicated by chain lines in FIG. 4, whereby the equalizer 54 supported on the nut member 31 moves rearward and the Bowden cables 13, 13 are loosened. Then, the coil 63 of the electromagnetic brake 33 is not demagnetized, and the rotor 65 is held between the armature 67 and the plate 66 by virtue of the biasing force of the first coil springs 68, whereby the screw-threaded shaft 47 which is integral with the rotor 65 is restrained from being rotated with a certain external force in an unintended fashion. In addition, since the rotational shaft 75 is held at an upper first position (refer to FIG. 4) by virtue of the biasing force of the coil spring 78, the mesh engagement between the driving bevel gear 79 and the follower bevel gear 84 is released, and the release member 72 is situated at a lowered deactivated position (refer to FIG. 7).

When the electrically operated parking brake apparatus ECU 21 outputs an instruction to activate the electrically operated parking brake apparatus 12 from this state (refer to steps S5, S8 in FIG. 10), the coil 63 of the electromagnetic brake 33 is first magnetized so that the armature 67 is drawn by the core 62, whereby the armature 67 and the plate 66 move away from the rotor 65 and the screw-threaded shaft 47 is released from the restrained conditions. At the same time as this occurs, the electric motor 30 is driven, and the screw-threaded shaft 47 of the ball screw mechanism 49 rotates, so that the nut member 31 advances from the position indicated by the chain lines to a position indicated by solid lines in FIG. 4, whereby a tension is generated on the left and right Bowden cables 13, 13 connected to the equalizer 54 which advances together with the nut member 31, the left and right wheel brakes 11, 11 being thereby activated. Then, in case the tension on the left and right Bowden cables 13, 13 is not in balance, the equalizer 54 swings in a direction indicated by an arrow A–A' about the upper support shaft 51 and the lower support shaft 52 in FIG. 3 so that the tension on the left and right Bowden cables 13, 13 becomes uniform so as to generate brake forces of the same magnitude on the left and right wheel brakes 11, 11.

As has been described above, when the driving force of the electric motor 30 is transmitted to the Bowden cables 13, 13 via the ball screw mechanism 49 which can transmit the driving force in a reverse direction, the reaction force of the brake operation force applied to the Bowden cables 13, 13 (in other words, the tension of the Bowden cables 13, 13) acts on the electric motor 30 as a load. Consequently, if the magnitude of the load that is applied to the electric motor 30 and the magnitude of the brake operating force are memorized in advance, the magnitude of the brake operating force can be controlled to an optional target value based on the magnitude of the load of the electric motor 30 (for example, the current value of the electric motor 30 detected by the current sensor 29c).

In addition, since the ball screw mechanism 49 has good transmission efficiency with less friction force and looseness, a sufficient response can be secured even if a motor which is small in size and light in weight is utilized for the electric motor 30, and additionally the noise can be reduced that would be generated when in operation. Furthermore, since the ball screw mechanism 49 is smaller in size than the reduction gear mechanism, the overall size of the electrically operated parking brake apparatus 12 can be reduced.

Thus, when the electrically operated parking brake apparatus 12 is activated, and then a required brake force is generated on the left and right wheel brakes 11, 11, the electric motor 30 is stopped and the coil 63 of the electromagnetic motor 33 is demagnetized, so that the rotor 65 is held between the armature 67 and the plate 66 by virtue of the biasing force of the first coil springs 68, whereby the rotation of the screw-threaded shaft 47 is restrained. This ensures that the unintended rotation of the screw-threaded shaft 47 is restrained to thereby prevent the brake force on the wheel brakes 11, 11 from being released even if the tension of the Bowden cables 13, 13 is transmitted back to the screw-thread shaft 47 of the ball screw mechanism 49 in a reverse fashion.

In addition, since the electromagnetic brake 33 drives the armature 67 to control the rotation of the screw-threaded shaft 47 by virtue of friction force acting between the plate 66 and armature 67 and the rotor 65, the inertia force of the electric motor 30 can be controlled accurately to thereby control the stop position in a precise fashion when compared to a case where a rotating preventing means such as a ratchet mechanism is used. Moreover, since the restraint and release of restraint of the rotor 65 can be implemented moderately via friction force, the operation noise can be reduced.

Now, when the electrically operated parking brake apparatus ECU 21 outputs an instruction to deactivate the electrically operated parking brake apparatus 12 (refer to steps S6, S9 in FIG. 10), the coil 63 of the electromagnetic brake 33 is first magnetized to release the restraint of the screw-threaded shaft 47, and in this state the electrically operated parking apparatus ECU 21 drives the electric motor 30 in a direction opposite to the direction described previously so as to rotate the screw-threaded shaft 47 of the ball screw mechanism 49 in a reverse direction, whereby the nut member 31 is withdrawn from the position indicated by the solid lines in FIG. 4 to the position indicated by the chain lines so as to deactivate the left and right wheel brakes 11, 11.

In case the electric motor 30 or the control system thereof fails while the electrically operated parking brake apparatus 12 is generating the brake force on the wheel brakes 11, 11, the driver may manually deactivate the parking brake apparatus (refer to step S10 in FIG. 10). Due to this, as shown in FIG. 8, when the hexagonal wrench 80 is inserted into the hexagonal hole 75a in the rotational shaft 75 so as to press down the rotational shaft 75 to a second position against the biasing force of the coil spring 78, the driving bevel gear 79 of the rotational shaft 75 is brought into mesh engagement with the follower bevel gear 84 of the screw-threaded shaft 47.

Figure 9:
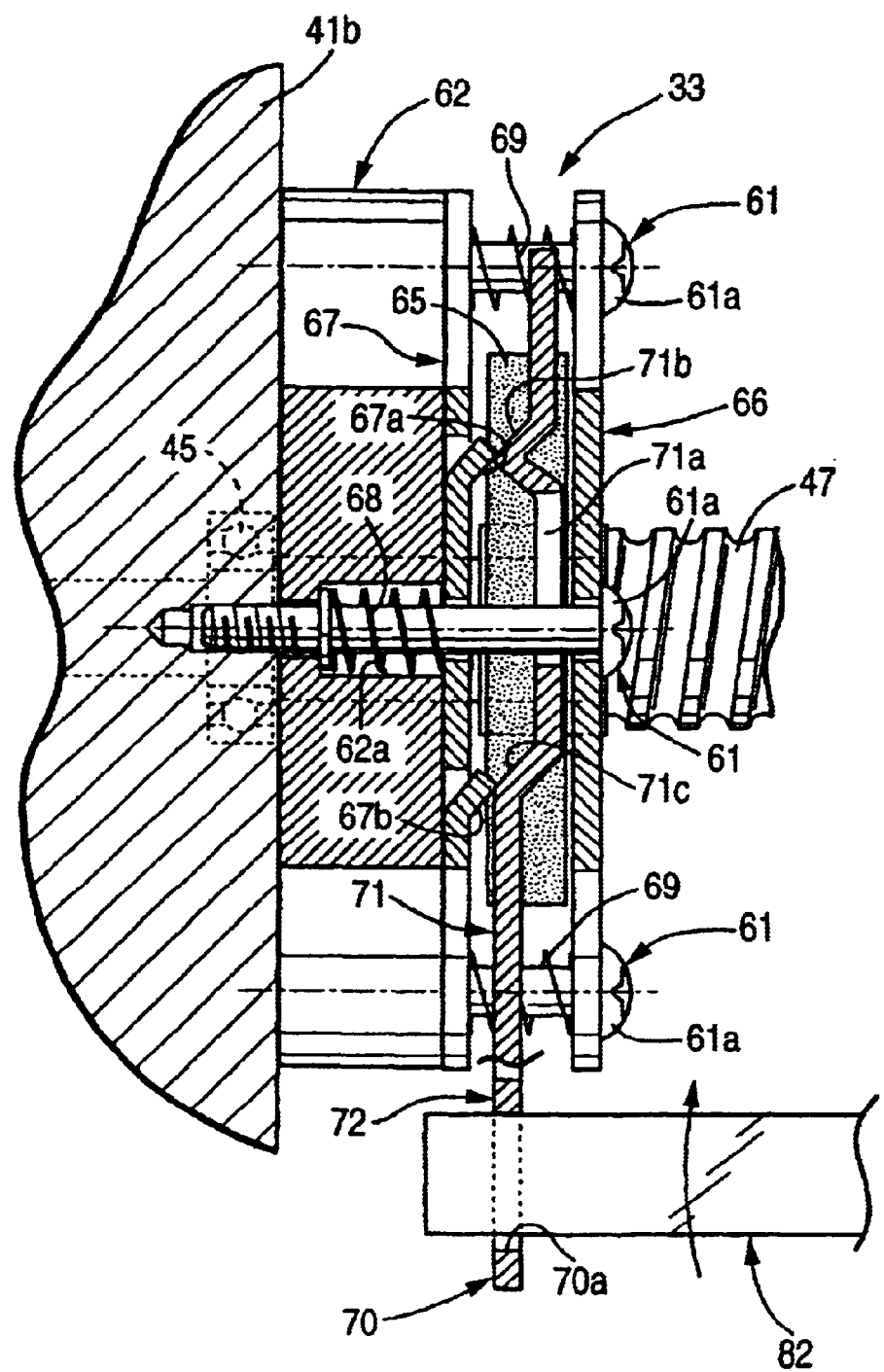
FIG. 9 is an operation explaining diagram which corresponds to FIG. 7.

Further, since the rear end of the lever 82 supported by the pin 81 at the central portion thereof is pushed down with the front end thereof being pushed up, the release member 72 connected to the front end thereof is raised between the plate 66 and the armature 67. As a result, as shown in FIG. 9, since the inclined surfaces 71b, 71b; 71c, 71c provided on the release member 72 ride on the inclined surfaces 67a, 67a; 67b, 67b provided on the armature 67, the plate 66 and the armature 67 move away from the rotor 65 against the biasing force of the first coil spring 68, whereby the electromagnetic brake 33 can be released manually without magnetizing the coil 63.

Figure 8:
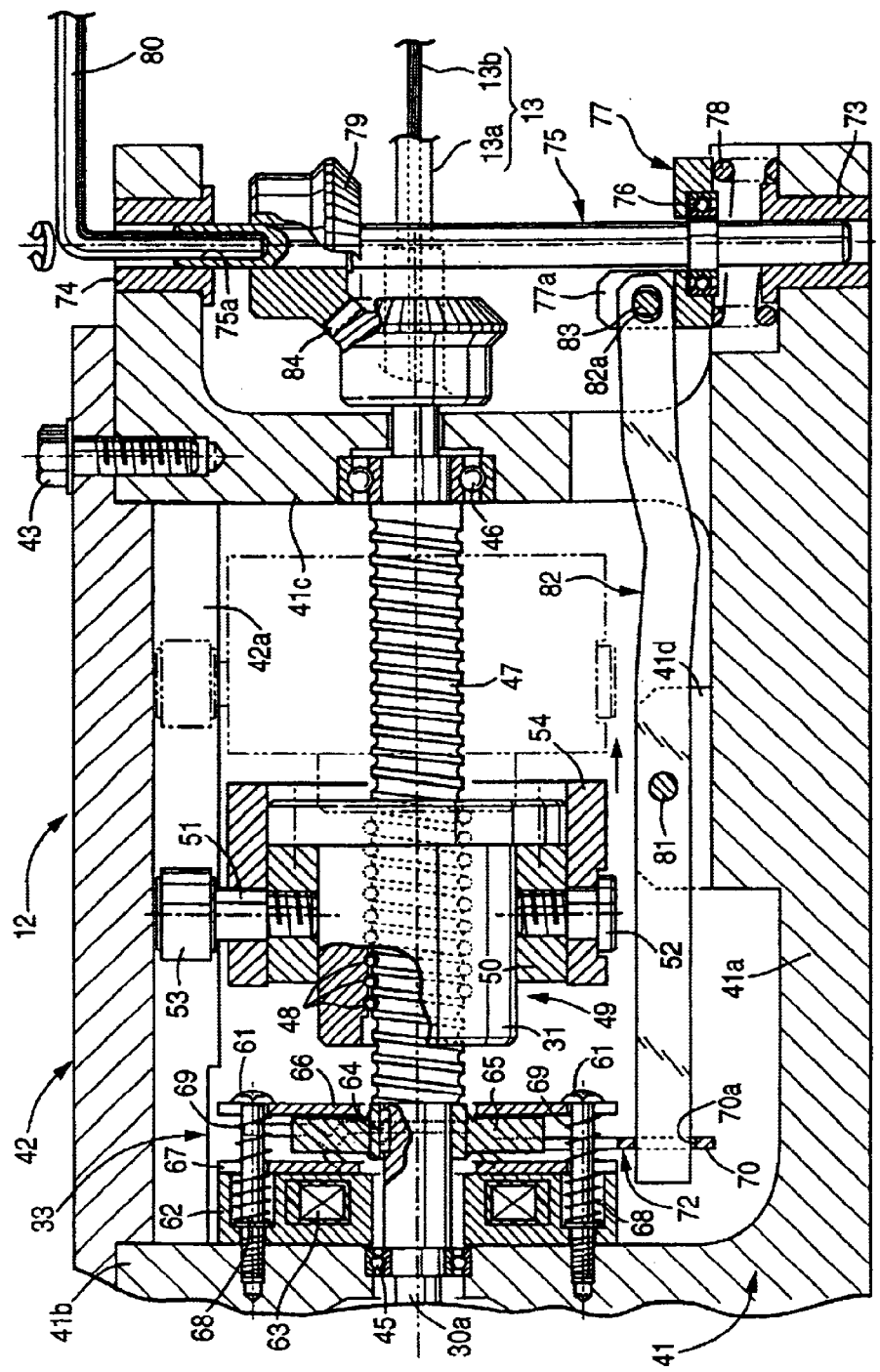
FIG. 8 is an operation explaining diagram which corresponds to FIG. 4.

Consequently, the screw-threaded shaft 47 can be rotated via the driving bevel gear 79 and the follower bevel gear 84 which are in mesh engagement by rotating the rotational shaft 75 with the hexagonal wrench 80 from this sate, whereby the nut member 31 can be moved from a position indicated by solid lines in FIG. 8 to a position indicated by chain lines. Thus, the Bowden cables 13, 13 can be loosened to deactivate the wheel brakes 11, 11.

Of course, in case the activation of the electrically operated parking brake apparatus 12 by the electric motor 30 becomes impossible due to a failure, as has been described above, the electrically operated parking brake apparatus 12 can be activated through the manual operation with the hexagonal wrench 80. In this case, the hexagonal wrench 80 is rotated in a direction opposite to the direction described previously so that the nut member 31 is moved from the position indicated by the chain lines in FIG. 8 to the position indicated by the solid lines.

Thus, when the electric motor 30 or the control system thereof fails, the electric operated parking brake apparatus can manually be activated or deactivated through a simple operation in which the hexagonal wrench 80 is inserted into the hexagonal hole 75a of the rotational shaft 75 so as to rotate the rotational shaft 75 while pushing down the same, whereby the conveniences can be improved remarkably.

While the embodiment of the invention has been described in detail heretofore, the invention may be modified in design in various ways without departing from the sprit and scope thereof.

For example, while the electrically operated parking brake apparatus 12 and the wheel brakes 11, 11 are connected to each other with the Bowden cables 13, 13 in the embodiment, in addition to the Bowden cables 13, 13, rods, links or arms may be used solely or in combination to form the transmission member. Alternatively, rods, links or arms may be used in combination with the Bowden cables 13, 13 to form the transmission member.

In addition, while the ball screw mechanism 49 is used as the screw mechanism in the embodiment, any screw mechanism other than the ball screw mechanism may be used.

Furthermore, while in the embodiment the axis L1 of the upper support shaft 51 and the lower support shaft 52 for supporting the equalizer 54 on the nut member 31 in the swinging fashion is disposed in the perpendicular direction and the line L2 connecting the portions where the pair of Bowden cables 13, 13 are connected to the equalizer 54 is disposed in the horizontal direction, the positional relationship of the axes L1 and L2 may be changed such that the positions are interchanged.

As has been described above, according to the invention, since the axis of the pair of support shafts provided at the positions facing each other across the screw-threaded shaft for supporting the equalizer on the nut member in the swinging fashion passes through the center of the screw-threaded shaft, the generation of an unbalanced load is prevented which attempts to bend the screw-threaded shaft in a direction normal to a plane containing the axis of the pair of support shafts. In addition, since the line connecting the portions where the pair of transmission members are connected to the equalizer passes through the center of the screw-threaded shaft, the generation of an unbalanced load is prevented which attempts to bend the screw-threaded shaft in a direction normal to a plane containing the line connecting the portions where the pair of transmission members are connected to the equalizer. Thus, the increase in the number of components and enlargement of the size of the parking brake apparatus 12 can be avoided, and smooth operation of the screw mechanism can be assured by preventing the generation of an unbalanced load which is applied to the screw-threaded shaft.

What is claimed is:

1. A parking brake apparatus, comprising:
    a pair of transmission members for transmitting a brake operating force to wheel brakes;
    an electric motor;
    a screw mechanism including a screw-threaded shaft adapted to be rotationally driven by said electric motor, and a nut member meshing with said screw-threaded shaft, said nut member being movable along said screw-threaded shaft by the rotation of said screw-threaded shaft;
    an equalizer having connecting portions connecting said pair of transmission members; and
    a pair of support shafts disposed at positions facing each other across said screw-threaded shaft for swingably supporting said equalizer on said nut member,
    wherein a common longitudinal axis of said pair of support shafts substantially passes through a center of said screw-threaded shaft, and a line connecting said connecting portions of said equalizer substantially passes through the center of said screw-threaded shaft.

2. The parking brake apparatus according to claim 1, wherein said axis of said pair of support shafts and said line connecting said connecting portions of said equalizer substantially perpendicularly intersect with each other at the center of said screw-threaded shaft.

3. The parking brake apparatus according to claim 1, wherein said equalizer includes a substantially oval opening surrounding an outer periphery of said nut member.

4. The parking brake apparatus according to claim 1, further comprising:
    a housing and a cover cooperatively accommodating said screw mechanism, one of said housing and said cover defining a guide groove formed along an axis of said screw-threaded shaft; and
    a guide roller rotatably supported on one of said support shafts, said guide roller movably fitted onto said guide groove.

5. The parking brake apparatus according to claim 1, further comprising a control unit operable to activate said electric motor in response to input received from vehicle sensors.

6. The parking brake apparatus according to claim 5, wherein the input comprises vehicle operating conditions including an inclination of a road surface, a longitudinal acceleration of the vehicle, wheel speeds, a master cylinder pressure of the vehicle, operating conditions of a brake pedal of the vehicle, throttle and shift positions of the vehicle, and idle stop.

* * * * *